(12) United States Patent
Gordon et al.

(10) Patent No.: US 7,845,712 B2
(45) Date of Patent: Dec. 7, 2010

(54) VEHICLE CLOSURE ASSEMBLY WITH SEALED SPLIT BETWEEN INDEPENDENTLY SELECTABLE CLOSURE PANELS

(75) Inventors: Garl W. Gordon, Fenton, MI (US); Roderick L. Lemmer, Birmingham, MI (US); John Acker, Farmington Hills, MI (US); Thomas J. Hurrish, Oxford, MI (US); Henry J. Nykiel, Howell, MI (US); Frederick Draska, White Lake, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 523 days.

(21) Appl. No.: 11/871,266

(22) Filed: Oct. 12, 2007

(65) Prior Publication Data

US 2009/0096252 A1    Apr. 16, 2009

(51) Int. Cl.
    *B62D 33/06* (2006.01)
(52) U.S. Cl. .................................. 296/190.11
(58) Field of Classification Search ............ 296/190.11, 296/146.9, 146.11, 146.12
    See application file for complete search history.

(56) References Cited

U.S. PATENT DOCUMENTS

| 5,273,336 | A | | 12/1993 | Schubring et al. |
| 5,522,656 | A | | 6/1996 | Jenkins |
| 5,662,377 | A | * | 9/1997 | Holdampf et al. ............ 297/238 |
| 6,076,880 | A | * | 6/2000 | Coffer et al. .............. 296/65.09 |
| 6,296,291 | B1 | * | 10/2001 | Lansinger ................. 296/65.16 |
| 6,341,820 | B1 | | 1/2002 | Kimura et al. .......... 297/378.13 |
| 6,398,291 | B1 | * | 6/2002 | Reusswig et al. ......... 296/186.4 |
| 6,513,863 | B1 | | 2/2003 | Renke et al. |
| 6,648,398 | B2 | | 11/2003 | Duffy |
| 6,694,676 | B2 | * | 2/2004 | Sakamoto et al. ............. 49/366 |
| 6,742,834 | B1 | | 6/2004 | Merritt et al. |
| 6,786,535 | B1 | * | 9/2004 | Grzegorzewski et al. ...................... 296/190.11 |
| 6,796,600 | B1 | | 9/2004 | Ferer et al. |
| 6,837,529 | B2 | | 1/2005 | Kharod et al. |
| 7,036,872 | B1 | | 5/2006 | Czirmer |
| 7,059,654 | B2 | * | 6/2006 | Ichinose ................... 296/146.1 |
| 2007/0152473 | A1 | * | 7/2007 | Lechkun et al. ......... 296/146.12 |
| 2009/0072582 | A1 | * | 3/2009 | Elliott et al. ........... 296/146.11 |
| 2010/0109376 | A1 | * | 5/2010 | Plavetich ................. 296/146.5 |

FOREIGN PATENT DOCUMENTS

| DE | 102005062219 A1 | 7/2006 |
| EP | 1 839 923 A2 | 3/2007 |

\* cited by examiner

*Primary Examiner*—H Gutman
(74) *Attorney, Agent, or Firm*—Quinn Law Group, PLLC

(57) ABSTRACT

A split vehicle closure assembly for a vehicle utilizes a novel seal assembly, latching mechanism and hinges, all of which cooperate to permit the vehicle closure assembly to selectively seal an opening to a vehicle compartment, preventing, dirt, liquid and fumes from entering through the vehicle closure assembly, or to be opened partially or fully to provide various configurations for access to the compartment through the opening.

11 Claims, 10 Drawing Sheets

VEHICLE CLOSURE ASSEMBLY WITH SEALED SPLIT BETWEEN INDEPENDENTLY SELECTABLE CLOSURE PANELS

TECHNICAL FIELD

The invention relates to a vehicle closure assembly having two side-by-side closure panels defining a split with a seal therebetween and each independently pivotable between an open and a closed position relative to an opening between adjacent vehicle cargo compartments without interference with the seal.

BACKGROUND OF THE INVENTION

It is known in the art to provide side-by-side closure panels to selectively close off an opening to a vehicle compartment, such as a pickup truck bed. Such closure panels may be reconfigured between closed and open positions to allow access between adjacent compartments. For example, both closure panels may be closed, both may be opened, a first may be closed while the second is open or the second may be closed while the first is open. This design flexibility enhances vehicle utility by allowing various configurations to fit customer needs. For example, if the closure panels are a midgate separating a truck bed from a passenger compartment, and the customer desires to transport cargo that is longer than the truck bed length, one of the closure panels may be open to allow cargo to extend from the truck bed into a portion of the passenger compartment. It is desirable to offer such user flexibility while still ensuring that the passenger compartment is sealed from outside elements when both closure panels are closed.

SUMMARY OF THE INVENTION

A split vehicle closure assembly for a vehicle utilizes a novel seal assembly, latching mechanism and hinges, all of which cooperate to permit the vehicle closure assembly to selectively seal an opening to a vehicle compartment, preventing, dirt, liquid and fumes from entering through the vehicle closure assembly, or to be opened partially or fully to provide various configurations for access to the compartment through the opening. Specifically, a vehicle closure assembly includes first and second closure panels mounted side-by-side to a vehicle body. The closure panels are independently selectively pivotable with respect to the vehicle body about at least one pivot axis between an open position in which the respective closure panel does not close a respective portion of the opening, and a closed position in which the respective pivoted panel closes the respective portion of the opening. The closure panels define a split between themselves when both are in the closed position. A seal assembly is connected to the closure panels along the split to seal the split when the opening is closed by the closures panels, the seal assembly and closed closure panels thereby sealing the opening. Additionally, a hinge operatively connected to one of the closures panels to permit the pivoting of that closure panel is configured to allow sufficient separation of the closure panels at the seal assembly, thus allowing the independent pivoting of the closure panels to occur without interference from the seal assembly. The seal assembly has a seal portion on each of the closure panels. As used herein "without interference from the seal assembly" means that the seal portions will not contact one another or any portion of the adjacent closure panel in order to protect the integrity of the seal assembly. The independent pivoting allows access to the compartment through different portions of the opening, or through the entire opening if both closure panels are pivoted open.

In one aspect of the invention, the vehicle closure assembly includes a first latching mechanism that selectively secures the closure panels to one another and releases the closure panels from one another. In one embodiment, the first latching mechanism is operatively connected to the hinge, referred to as the first hinge, such that when the latching mechanism is moved laterally, the first hinge moves laterally. The first hinge has first and second sets of pins that establish different pivot axes for the closure panel attached to the first hinge, referred to as the first closure panel, depending on the position of the latching mechanism. The different pivot axes establish two different swing arcs for the first closure panel when pivoting. The different swing arcs provide the separation needed at the split to protect the seal assembly during pivoting of the closure panels. The other closure panel has a hinge with a single pivot axis that is common with one of the pivot axes of the first hinge so that the closure panels may selectively be pivoted in unison. In this embodiment, laterally extending hooks that engage with laterally extending retainers may be secured to the closure panels. The hooks engage with the retainers when the closure panels are in the closed position, and are disengaged when the closure panels are opened by pivoting about the different pivot axes established when the latching mechanism is unlatched.

In another embodiment, the first hinge includes a cam configured to cause the first closure panel to move laterally as it is pivoted, assuming the latching mechanism is unlatched to release the closure panels from one another. The lateral movement creates the separation at the vertical split to allow pivoting without interference from the seal assembly.

In another aspect of the invention, another latching mechanism selectively secures or releases the closure panels in the closed position. The vehicle closure assembly may be a midgate closure assembly, in which case the latching mechanism may secure the closure panels to and release the closure panels from a crossbar that spans the opening and is secured to the vehicle body.

The seal assembly may be configured according to many embodiments within the scope of the invention, including one in which a first seal portion on a first of the closure panels is configured to nest within a second seal portion on the other of the closure panels when both closure panels are in a closed position, to enhance sealing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
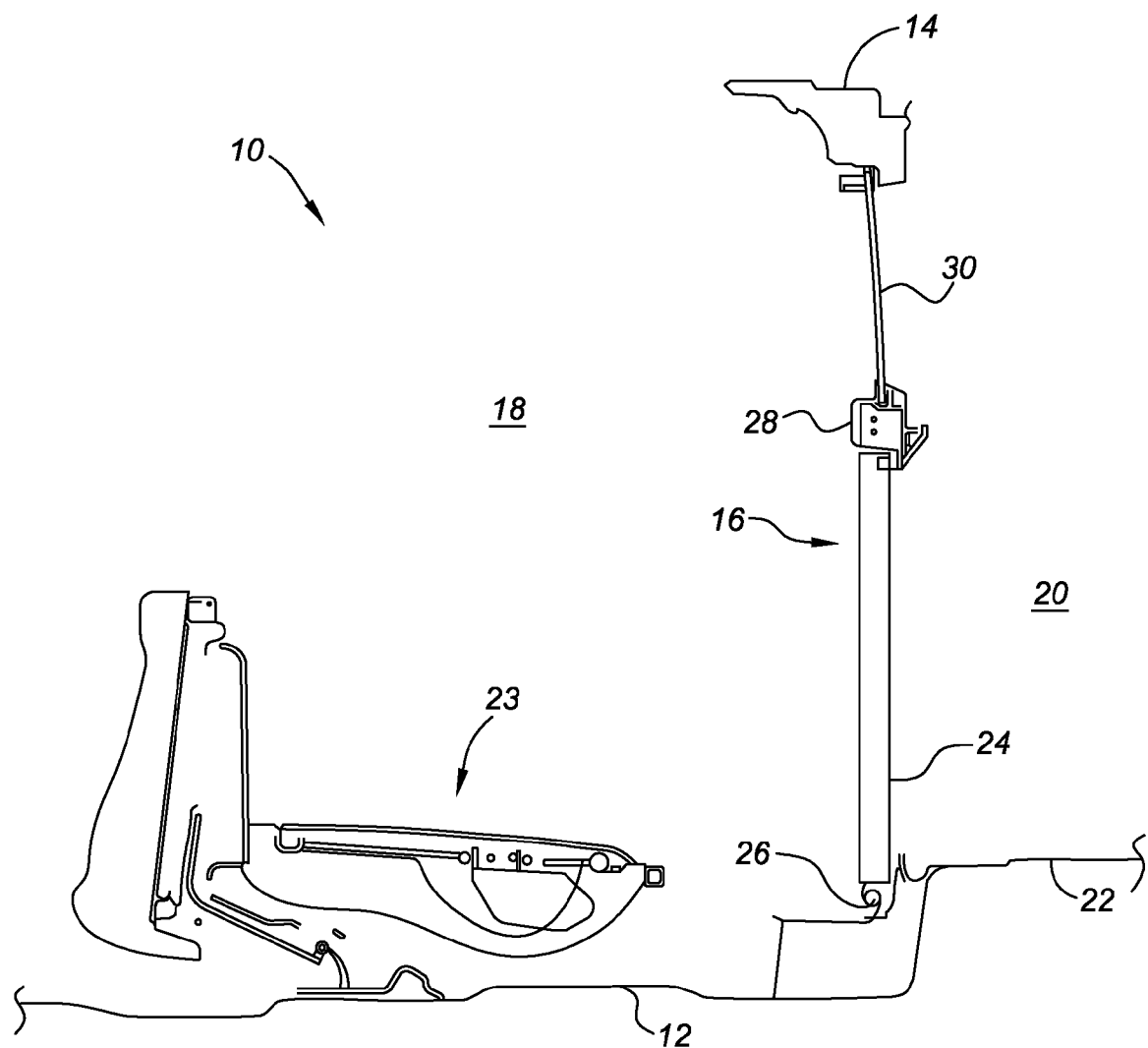
FIG. 1 is a schematic illustration in side fragmentary view of a vehicle body with a midgate vehicle closure assembly sealing an opening between an interior passenger compartment and an exterior truck bed and including a collapsed vehicle seat.

Referring to the drawings, wherein like reference numbers refer to like components, FIG. 1 shows a portion of a vehicle 10 with a vehicle body including a vehicle floor assembly 12 and an upper body portion 14, such as a roof and sidewall assembly. A vehicle closure assembly 16 divides an interior passenger compartment 18 from a cargo compartment 20, formed in part by a trunk bed portion 22 of the floor assembly 12, serving as a midgate closure assembly. A vehicle seat 23 is shown in a collapsed position in the interior passenger compartment 18. The vehicle closure assembly 16 utilizes a novel seal assembly, latching mechanism and hinges, all of which cooperate to permit the vehicle closure assembly 16 to selectively seal the interior passenger compartment 18 from dirt, liquid and fumes in the cargo compartment 20, or to be opened partially or fully to provide various configurations for access to the interior passenger compartment 18 from the cargo compartment 20, such as for loading cargo longer than the cargo compartment 20.

Figure 2A:
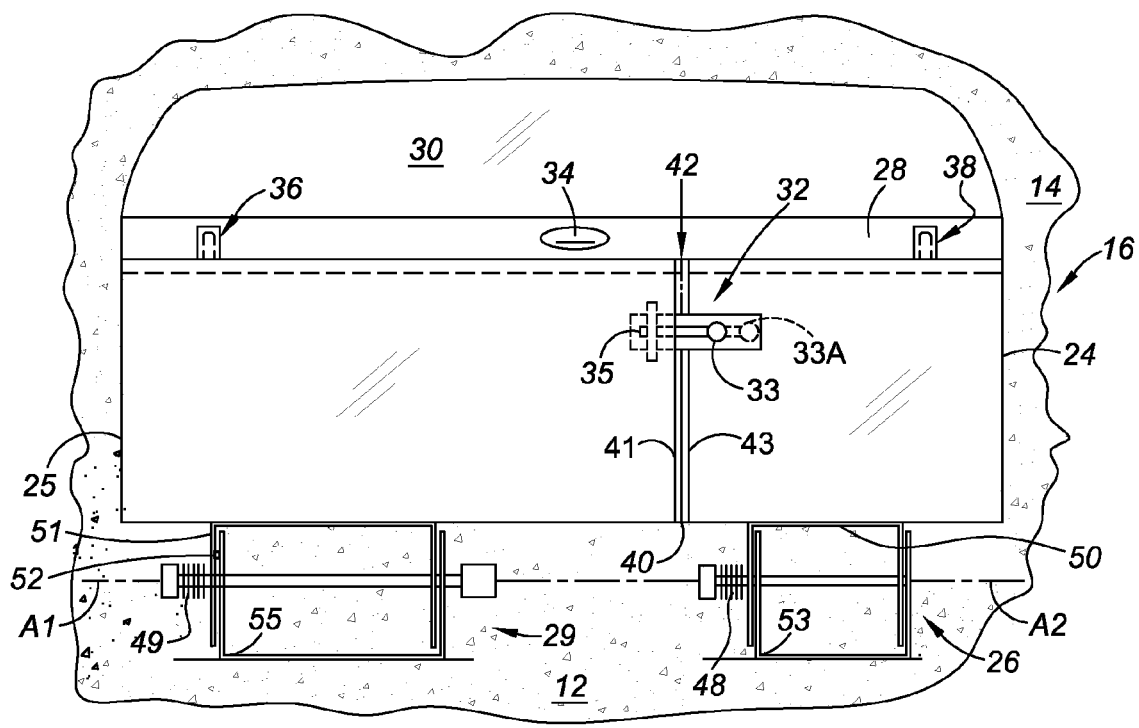
FIG. 2A is a schematic illustration in front view of a first embodiment of the vehicle closure assembly of FIG. 1 with first and second closure panels both in closed positions defining a vertical split therebetween, with a midgate latching mechanism latched.

The vehicle closure assembly 16 includes two side-by-side closure panels 24 and 25, better viewed in FIG. 2A, only one of which (closure panel 24) is visible in the side view of FIG. 1. The closure panel 24 is secured at a hinge 26 to the floor assembly 12 and by a crossbar latch assembly (not shown in FIG. 1; discussed further below) to a crossbar 28. A glass panel 30 is secured between the crossbar 28 and the upper body portion 14, and is preferably selectively removable, as is known in the art.

Referring to FIG. 2A, the vehicle closure panel assembly 16 is viewed looking rearward from inside the interior passenger compartment 18 (shown in FIG. 1), with both closure panels 24, 25 in a closed position. As used herein, closure panel 24 is referred to as the second closure panel and closure panel 25 is referred to as the first closure panel. The closure panels 24, 25 are of different sizes in order to provide different ways to access the interior passenger compartment 18 through the closure assembly 16 to allow different combinations of cargo capacity to interior compartment seating capacity, as described below. For example, with the interior surface area of closure panel 25 to the interior surface area of closure panel 24 may be approximately a 60:40 ratio, as viewed in FIG. 2A. The closure panels 24, 25 are supported on respective hinge assemblies 26, 29. In FIG. 2A, the closure panels 24, 25 are latched to one another by a midgate latching assembly 32. The midgate latching assembly 32 includes a lever 33 connected with an arm 35 captured within a recess in closure panel 25 to secure the closure panels 24, 25 to one another for side-by-side, parallel alignment. The lever 33 may be moved to a release position 33A to release the midgate latching assembly 32 so that the closure panels 24, 25 are no longer constrained in parallel alignment by the midgate latching assembly 32.

The closure panels 24, 25 are also latched to the crossbar 28 by a crossbar latching assembly that includes an actuating handle 34 and latch/striker assemblies 36, 38. The handle 34 may be moved to release the latch/striker assemblies 36, 38 so that the closure panels 24, 25 are no longer secured to the crossbar 28. Many types of latch/striker assemblies that may be actuated by movement of a handle are known to those skilled in the art. For example, movement of the handle 34 may complete and electrical circuit to power small motors within the crossbar 28 that disengage latches from the strikers in the latch/striker assemblies 36, 38 to release the closure panels 24, 25 from the crossbar 28. Any known designs may be used for the actuating handle 34 and latch/striker assemblies 36, 38.

Figure 5A:
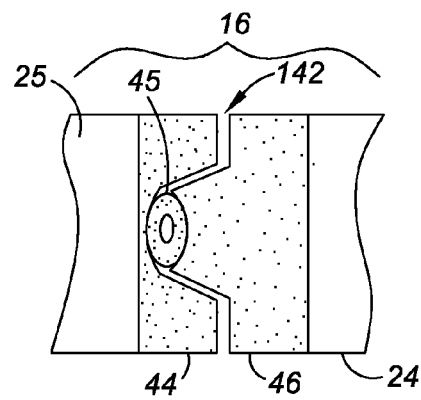
FIG. 5A is a schematic fragmentary illustration in bottom view of the seal assembly and closure panels of FIG. 2A.
Figure 5B:
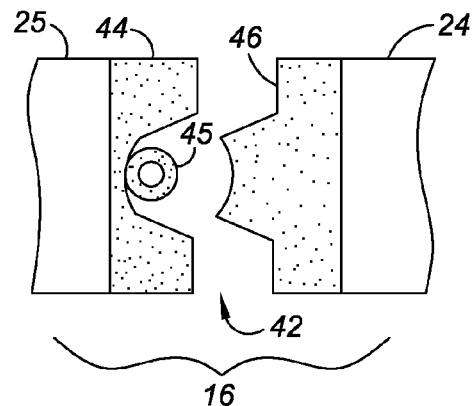
FIG. 5B is a schematic fragmentary illustration in bottom view of the seal assembly and closure panels of FIG. 2B.
Figure 5C:
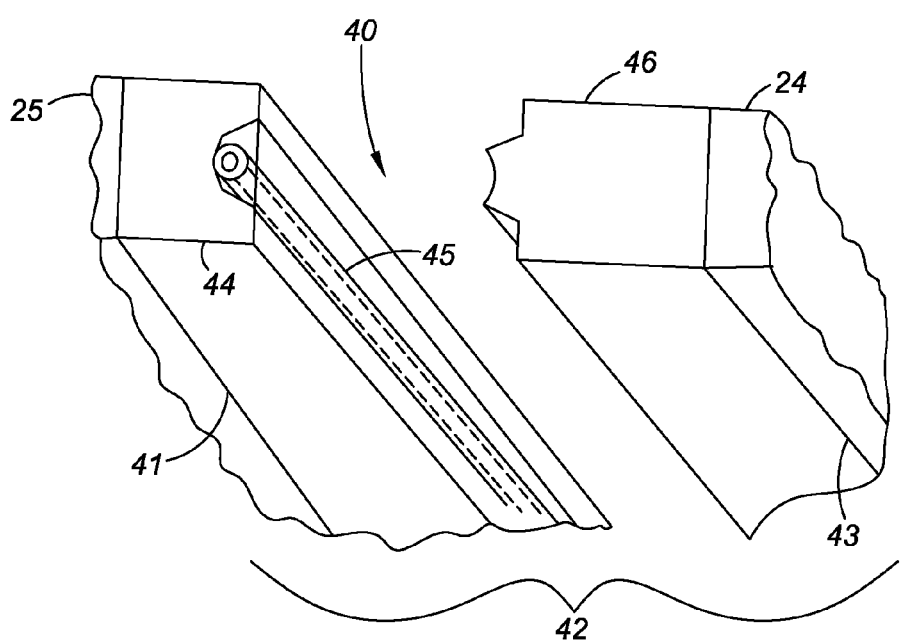
FIG. 5C is a schematic fragmentary illustration in perspective view of the seal assembly and closure panels of FIG. 2B.

The closure panels 24, 25 define a vertical split 40 at their adjacent edges 41, 43. A seal assembly 42 is secured to the adjacent edges to seal the vertical split 40 when the closure panels 24, 25 are both in the closed position, as shown in FIG. 2A. The seal assembly 42 is best shown in FIGS. 5A and 5B. In FIG. 5A, the seal assembly 42 is shown in a nested, sealing position achieved when the closure panels 24, 25 are secured to one another by the midgate latching assembly 32 in a latched position. A first seal portion 44 of the seal assembly 42 is secured to the closure panel 25 along the length of the edge 41 forming the vertical split 40 (as shown in FIG. 5C). A flexible seal member 45 is secured to the first seal portion 44. A second seal portion 46 of the seal assembly 42 is secured to the closure panel 24 along the edge 43 forming the vertical split 40 (as shown in FIG. 5C). (Only the bottom end of the seal assembly 42 and closure panels 24, 25 are shown in FIGS. 5A, 5B, perpendicular to the edges 41, 43 and vertical split 40 shown in FIGS. 2A and 5C.) When the closure panels 24, 25 are latched to one another by the midgate latching assembly 32, the portions 44, 46 of the seal assembly 42 are tightly compressed to one another to seal the vertical split 40. The sealing function of the seal assembly 42 is aided by the hinge 26. The hinge 26 includes and upper hinge portion 50 secured to the closure panel 24 and a lower hinge portion 53 secured to the floor assembly 12. The upper hinge portion 50 (and thus closure panel 24) is permitted slight lateral or side-to-side movement with respect to the fixed lower hinge portion 53. A spring 48 biases the upper hinge portion 50 and closure panel 24 toward the left in FIG. 2A (i.e., toward the other closure panel 25). Similarly, an upper hinge portion 51 of hinge 29 is secured to closure panel 25 and a lower hinge portion 55 is secured to the floor assembly 12. The upper hinge portion 51 (and thus closure panel 25) is permitted slight lateral or side-to-side movement with respect to fixed lower portion 55. A spring 49 included in hinge 29 biases the upper hinge portion 51and closure panel 25 toward the right in FIG. 2A (i.e., toward closure panel 24). Movement of the lever 33 to the latched position thus pulls the closure panel 24 slightly to the left in FIG. 2A to tightly seal the vertical split 40. With the closure panels 24, 25 in the closed position of FIG. 2A and the seal assembly 42 tightly sealed, the midgate latching assembly 32 seals an opening 27 shown in FIG. 2B defined by the floor assembly 12, the vehicle upper body portion 14, and the crossbar 28. The springs 48, 49 are biased to urge the panels 24, 25 toward one another, thus exerting a slight pressure to encourage sealing of the seal assembly 42.

Figure 2B:
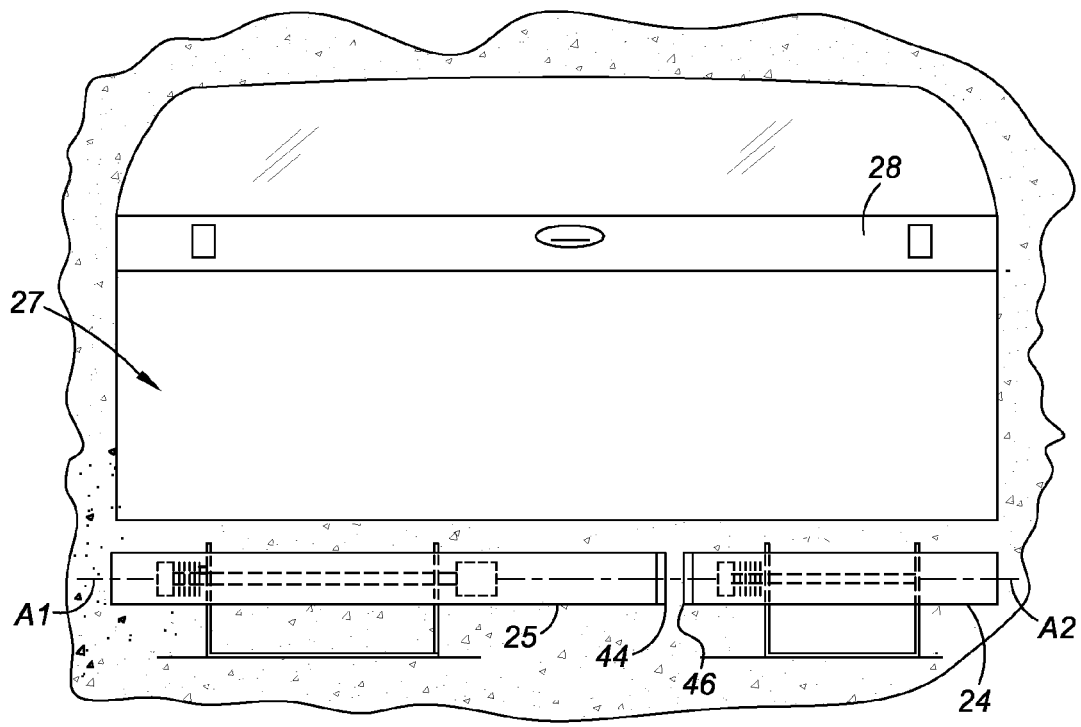
FIG. 2B is a schematic illustration in front view of the vehicle closure assembly of FIG. 2A, with both the first and second closure panels in open positions revealing a seal assembly at the vertical split and with the midgate latching mechanism unlatched.

When both the crossbar latching mechanism 34, 36, 38 and the midgate latching mechanism 32 have been released, the closure panels 24, 25 may both be rotated about respective hinge pivot axes A1, A2 to the open positions of FIG. 2B. The hinge 29 is configured with a cam 52 that causes lateral movement of closure panel 25 away from closure panel 24 (i.e., slightly leftward as shown in the open position of FIG. 2B) when closure panel 25 is pivoted about pivot axis A1 from the closed position of FIG. 2A to the open position of FIG. 2B. When both closure panels 24, 25 are in the open position as in FIG. 2B, the entire opening 27 is open to allow access from the cargo compartment 20 to the interior passenger compartment 18 shown in FIG. 1.

Figure 9A:
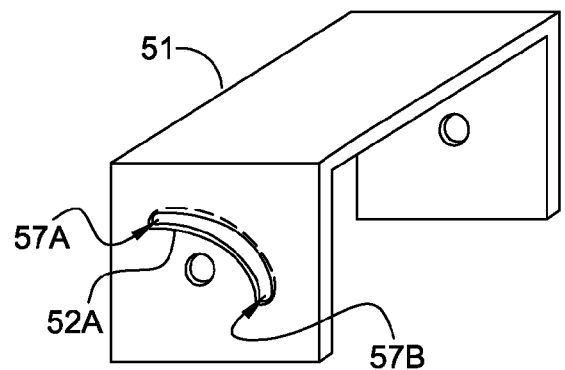
FIG. 9A is a schematic perspective illustration of an upper portion of a hinge included in the vehicle closure assembly of FIG. 2A, having a first portion of a cam.
Figure 9B:
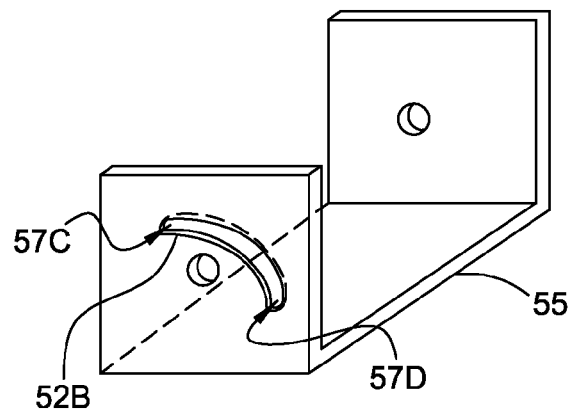
FIG. 9B is a schematic perspective illustration of a lower portion of the hinge included in the vehicle closure assembly of FIG. 2A, having a second portion of a cam.
Figure 9C:
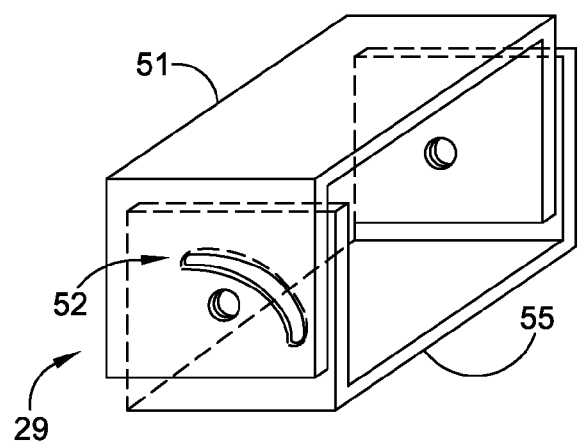
FIG. 9C is a schematic perspective illustration of the upper and lower portions of the hinge of FIGS. 9A and 9B assembled with the first and second portions of the cam nested within one another.

Referring to FIG. 9C, the hinge 29 is shown with the cam 52 incorporated in the upper and lower hinge portions 51, 55 to permit the lateral movement of the closure panel 25 of FIG. 2A when the closure panel 25 is pivoted downward to an open position. Referring to FIG. 9A, the upper hinge portion 51 includes a cam portion 52A, which is preferably a stamped, crescent shaped recess in the side of the hinge, with an upper recessed portion 57A of about 10 mm depth, a lower recessed portion 57B of 0 mm depth, with the cam portion 52A tapering between the two depths to form a ramp-like surface. Referring to FIG. 9B, the lower hinge portion 52 includes a cam portion 52B that is substantially identical to the cam portion 52B, having an upper recessed portion 57C of about 10 mm depth and a lower recessed portion 57B of about 0 mm depth. When the hinge portions 51, 55 are connected to the closure panel 25 and the floor assembly 12, respectively as illustrated in FIG. 2A, with the closure panel 25 in the closed position of FIG. 2A, the cam portions 52A, 52B form the cam 52, as illustrated in FIG. 9C, with the cam portions 52A, 52B nested within one another. As the closure panel 25 is pivoted to the lowered position of FIG. 2B, hinge portion 51 will rotate with respect to hinge portion 55, with the cam portion 52A moving out of nesting with cam portion 52B, and the closure panel 25 moving slightly to the left to enable seal portion 44 to separate from seal portion 46, as illustrated in FIG. 2B when the midgate latching assembly 32 is unlatched. If the midgate latching assembly 32 is latched, the closure panel 25 will still move to the left due to the cam 52, but closure panel 24 will also move to the left, as permitted by the spring 48, and the seal portions 44, 46 will remain sealed together.

Figure 2C:
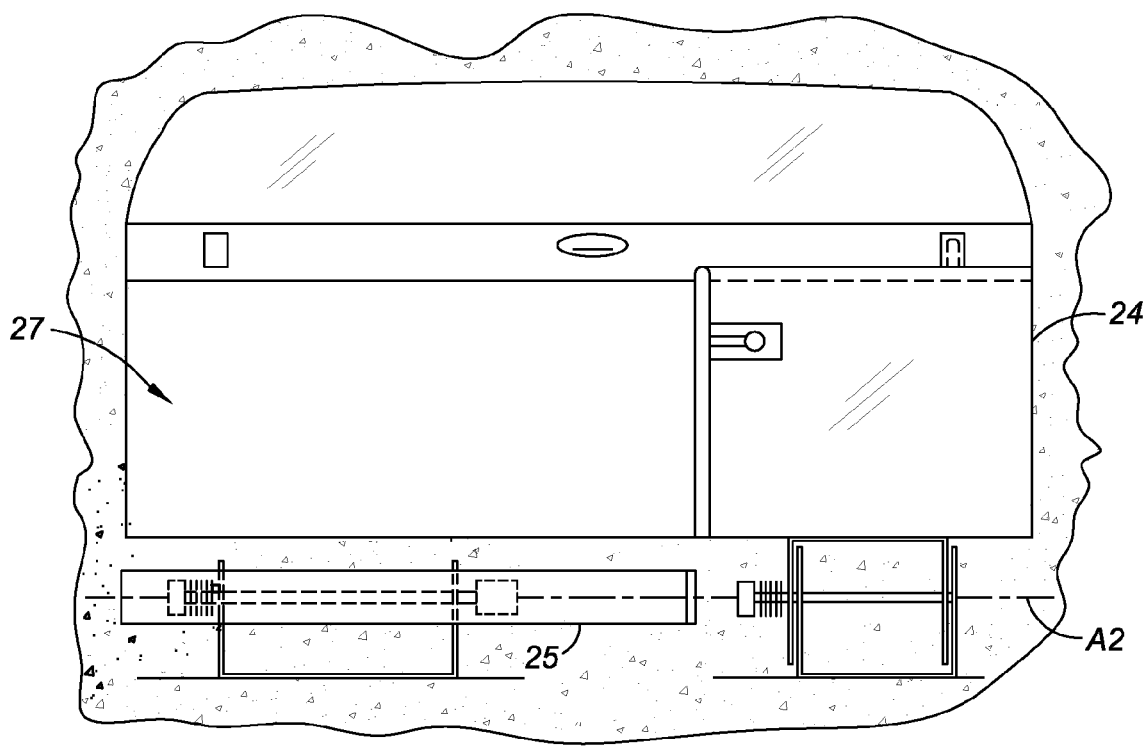
FIG. 2C is a schematic illustration in front view of the vehicle closure assembly of FIG. 2A with a first of the closure panels in an open position and a second of the closure panels in a closed position and with the midgate latching mechanism unlatched.
Figure 2D:
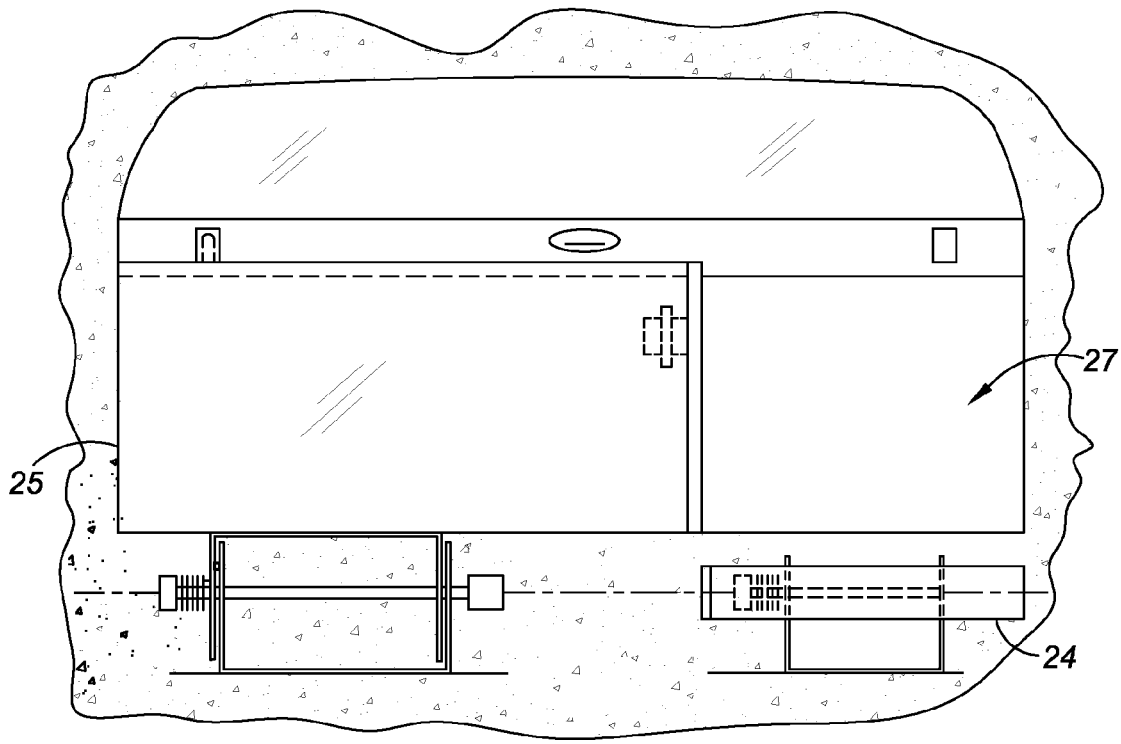
FIG. 2D is a schematic illustration in front view of the vehicle closure assembly of FIG. 2A with the second closure panel in an open position and the first closure panel in a closed position and with the midgate latching mechanism unlatched.

With the closure panels 24, 25 in the open positions of FIG. 2B, the seal portions 44, 46 are sufficiently separated due to the cam action of the cam 52 shown in FIG. 2A (i.e., converting rotary motion into linear motion), that either of the closure panels may now be returned to the open positions of FIG. 2A independently of the other closure panel without interfering with the seal (i.e., without the two seal portions 44, 46 contacting one another). Referring to FIG. 2C, the closure panel 24 is returned to the open position by pivoting about axis A2. In the configuration of FIG. 2C, the opening 27 is accessible above open closure panel 25 to allow about 60 percent access through the opening 27 between the cargo compartment 20 and the interior compartment 18 of FIG. 1. Referring to FIG. 2D, instead of closing closure panel 24, closure panel 25 is returned to the closed position so that the opening 27 is accessible above closure panel 24 to allow about 40 percent access through the opening 27 between the cargo compartment 20 and the interior compartment 18 shown in FIG. 1. In order to close and seal the entire opening 27 when in either of the configurations of FIGS. 2C and 2D, first, the closure panel that is in the closed position is reopened, and both closure panels 24, 25 are pivoted at the same time to the closed position of FIG. 2A. The midgate latching mechanism 32 and the crossbar latching mechanisms 34, 36, 38 are then re-secured.

Figure 8:
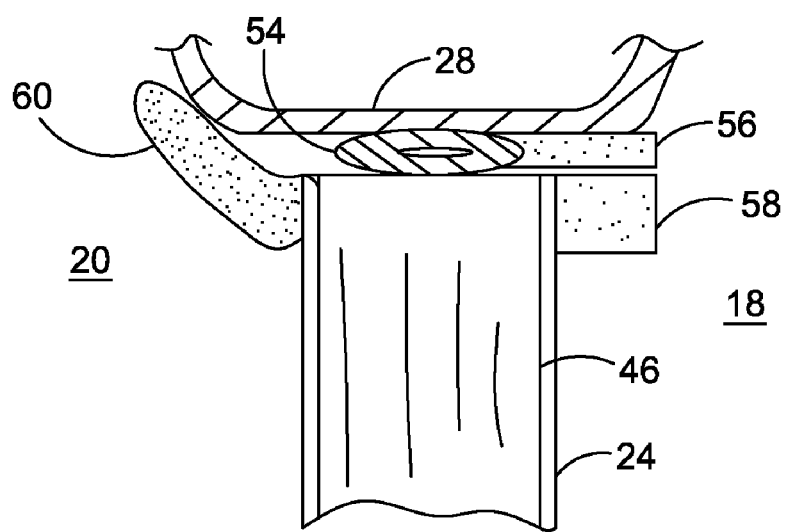
FIG. 8 is a schematic illustration in partial cross-sectional side view of the crossbar and the second closure panel of FIG. 2C with a portion of the seal assembly thereon.

It should be appreciated that, in addition to the seal assembly 42 at the vertical split 40, the closure panels 24, 25 are also sealed at the respective lower edges with the floor, the side edges abutting the vehicle upper body portion 14 and the upper edges at the crossbar 28. All of these sealing surfaces are with stationary members (i.e., the floor assembly 12, the upper body portion 14 and the crossbar 28) and there are no similar potential wear issues as with the relative pivoting motion of the abutting seal members 44, 46. For example, in FIG. 8, a side view of the seal member 46 secured to the closure panel 24 shows a crossbar seal member 54 secured to the crossbar 28 with a mucket 56 extending toward the interior compartment 18. A mucket 58 is also secured to the closure panel 24 to cooperate with mucket 56 in sealing between the crossbar 28 and the closure panel 24. Finally, a seal flange 60 extends along the top of the closure panel 24 to deflect moisture from entering between the crossbar 28 and the closure panel 24. A similar sealing arrangement is employed at the upper edge of closure panel 25 (not shown in FIG. 8) and at the lower edge of each closure panel 24, 25, between the closure panels 24, 25 and the floor assembly 20.

Figure 3A:
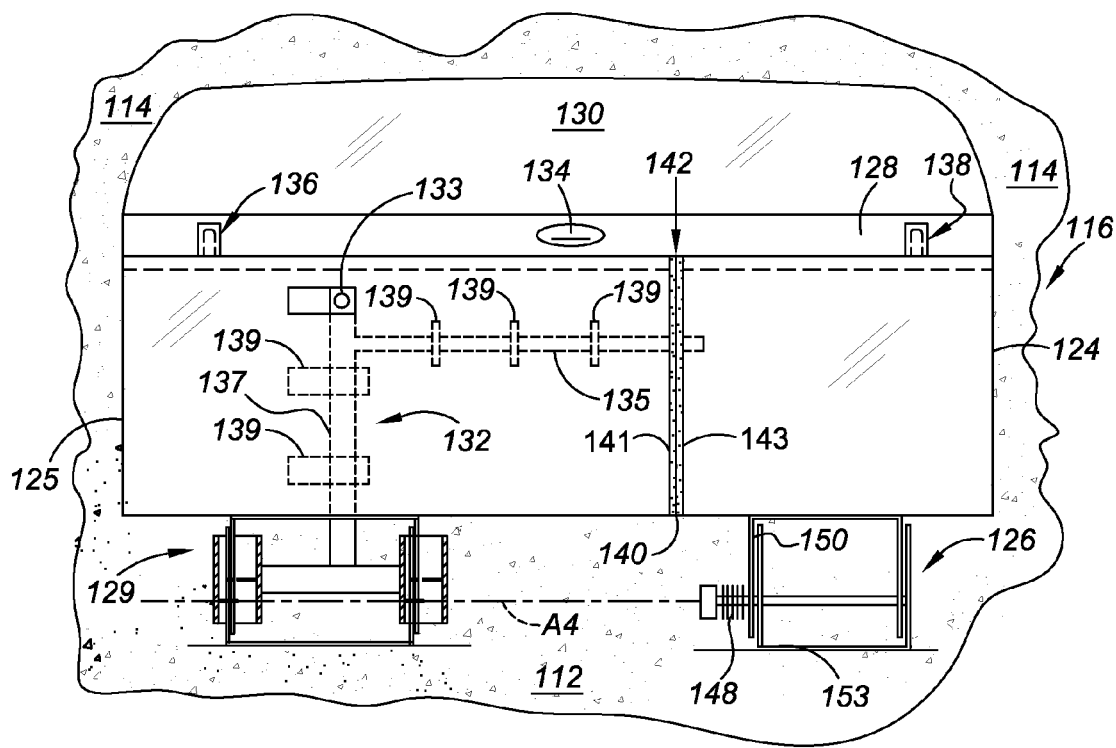
FIG. 3A is a schematic illustration in front view of a second embodiment of the vehicle closure assembly of FIG. 1 with first and second closure panels both in closed positions, a midgate latching mechanism latched and a hinge in partial cross-sectional view.

Referring to FIG. 3A, another embodiment of a vehicle closure assembly 116 is illustrated. The vehicle closure assembly 116 may be positioned in a vehicle similarly to vehicle closure assembly 16 of FIG. 1 to separate an interior passenger compartment from a cargo compartment and to selectively close and seal an opening therebetween and establish different configurations permitting access to the interior compartment from the cargo compartment through the opening, as discussed below.

Referring to FIG. 3A, the vehicle closure assembly 116 includes two side-by-side closure panels 124 and 125. The closure panel 124 is secured at a hinge 126 to a floor assembly 112 and by a crossbar latch assembly to a crossbar 128. A glass panel 130 is secured between the crossbar 128 and an upper body portion 114, and is preferably selectively removable, as is known in the art. The vehicle closure assembly 116 is viewed looking rearward from inside the interior passenger compartment, with both closure panels 124, 125 in a closed position. As used herein, closure panel 124 is referred to as the second closure panel and closure panel 125 is referred to as the first closure panel. The closure panels 124, 125 are of different sizes in order to provide different ways to access the interior compartment through the closure assembly 116 to allow different combinations of cargo capacity to interior compartment seating capacity, as described below. The closure panels are supported on respective hinges 126, 129.

The closure panels 124, 125 are latched to the crossbar 128 by a crossbar latching assembly that includes an actuating handle 134 and latch/striker assemblies 136, 138. The handle 134 may be moved to release the latch/striker assemblies 136, 138 so that the closure panels 124, 125 are no longer secured to the crossbar 128. Many types of latch/striker assemblies that may be actuated by movement of a handle are known to those skilled in the art. For example, movement of the handle 134 may complete an electrical circuit to power small motors within the crossbar 128 that disengage latches from the strikers in the latch/striker assemblies 136, 138 to release the closure panels 124, 125 from the crossbar 128. Any known designs may be used for the actuating handle 134 and latch/striker assemblies 136, 138.

In FIG. 3A, the closure panels 124, 125 are latched to one another by a midgate latching assembly 132. The midgate latching assembly 132 includes a lever 133 connected with an arm 135 that is captured within a recess in closure panel 125 to secure the closure panels 124, 125 to one another for side-by-side, parallel alignment. The lever 133 may be moved to a release position shown in FIG. 3C to release the midgate latching assembly 132 so that the closure panels 124, 125 are no longer constrained in parallel alignment by the midgate latching assembly 132. As explained further below, the midgate latching assembly 132 includes a leg 137 that moves laterally with the lever 133. Movement of the arm 135 and leg 137 are guided by support guides 139 connected to the interior of the closure panel 125.

The closure panels 124, 125 are also latched to the crossbar 128 by a crossbar latching assembly that includes an actuating handle 134 and latch/striker assemblies 136, 138. The handle 134 may be moved to release the latch/striker assemblies 136, 138 so that the closure panels 124, 125 are no longer secured to the crossbar 128. Many types of latch/striker assemblies that may be actuated by movement of a handle are known to those skilled in the art. For example, movement of the handle 134 may complete an electrical circuit to power small motors within the crossbar 128 that disengage latches from the strikers in the latch/striker assemblies 136, 138 to release the closure panels 124, 125 from the crossbar 128. Any known designs may be used for the actuating handle 134 and latch/striker assemblies 136, 138.

The closure panels 124, 125 define a vertical split 140 at their adjacent edges 141, 143. A seal assembly 142 is secured to the adjacent edges 141, 143 to seal the vertical split 140 when the closure panels 124, 125 are both in the closed position, as shown in FIG. 2A. The seal assembly 142 is best shown in FIGS. 4A and 4B. In FIG. 4A, the seal assembly 142 is shown in a sealing position achieved when the closure panels 124, 125 are secured to one another by the midgate latching assembly 132 in a latched position. A first seal portion 144 of the seal assembly 142 is secured to the closure panel 125 along the length of the edge 141 forming the vertical split 140. A second seal portion 146 of the seal assembly 142 is secured to the closure panel 124 along the edge 143 forming the vertical split 140. Flexible seal members 145A and 145B are secured to or form a part of the seal portions 144, 146, respectively. (Only the bottom end of the seal assembly 142 and closure panels 124, 125 are shown in FIGS. 4A, 4B, perpendicular to the edges 141, 143 and vertical split 140.) When the closure panels 124, 125 are latched to one another by the midgate latching assembly 132, the portions 144, 146 and seal members 145A, 145B of the seal assembly 142 are tightly compressed to one another to seal the vertical split 140. The sealing function of the seal assembly 142 is aided by the hinge 126. The hinge 126 includes an upper hinge portion 150 secured to the closure panel 124 and a lower hinge portion 153 secured to the floor assembly 112. The upper hinge portion 150 (and thus closure panel 124) is permitted slight lateral or side-to-side movement with respect to the fixed lower hinge portion 153. A spring 148 biases the upper hinge portion 150 and closure panel 124 toward the left in FIG. 3A (i.e., toward the other closure panel 125). With the closure panels 124, 125 in the closed position of FIG. 3A and the seal assembly 142 tightly sealed, the vehicle closure assembly 116 assembly seals an opening 127 shown in FIG. 3B defined by the floor assembly 112, the vehicle body 114, and the crossbar 128.

Figure 6A:
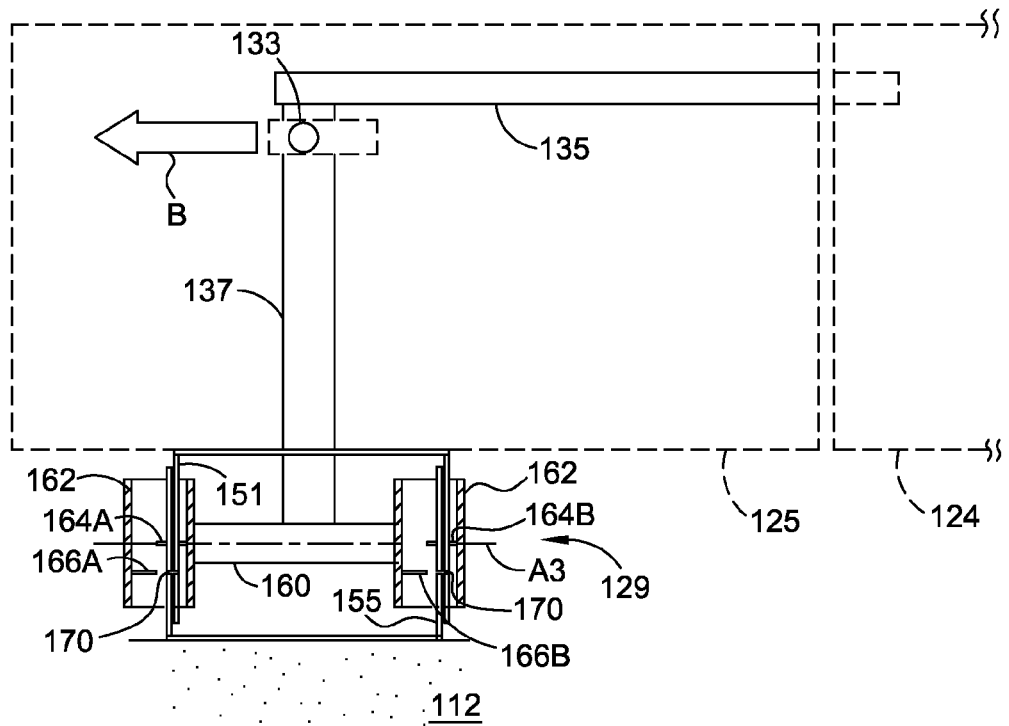
FIG. 6A is a schematic illustration in front view of the midgate latching mechanism and the hinge of the first closure panel of the vehicle closure assembly of FIGS. 3A-3F with the hinge shown in partial cross-sectional view, the closure panels shown in phantom and the midgate latching mechanism latched.

A portion of the hinge 129 is rigidly connected with a leg 137 that moves laterally within the closure panel 125 when lever 133 is moved laterally. Specifically, referring to FIGS. 6A and 6B, the leg 137 extends through an opening in the bottom of the closure panel 125 to connect with a post 160. Closure panels 124 and 125 are shown only schematically, and the seal assembly 142 is not shown. The post portion 160 moves laterally within the bounds of an upper hinge portion 151 secured to the closure panel 125 and a lower hinge portion 155 secured to the floor assembly 112. Supports 162 on either end of the post 160 include a first set of pins 164A and 164B that extend laterally and are aligned with a first set of apertures 168 (shown in FIG. 6B) in the upper and lower hinge portions 151, 155. The supports 162 also include a second set of pins 166A, 166B extending laterally in an opposing direction than the first set of pins 164A, 164B. The second set of pins 166A, 166B are aligned with a second set of apertures 170 in the upper and lower hinge portions 151, 155. When the lever 133 is moved in the direction of arrow B to the far left position shown in FIG. 6A, the arm 135 does not latch the closure panels 124, 125 to one another and the post portion 160 moves with the leg 137 so that the first set of pins 164A, 164B slide into apertures 168, establishing a pivot axis A3 for the hinge 129 and closure panel 125 through the first set of pins 164A, 164B.

Figure 6B:
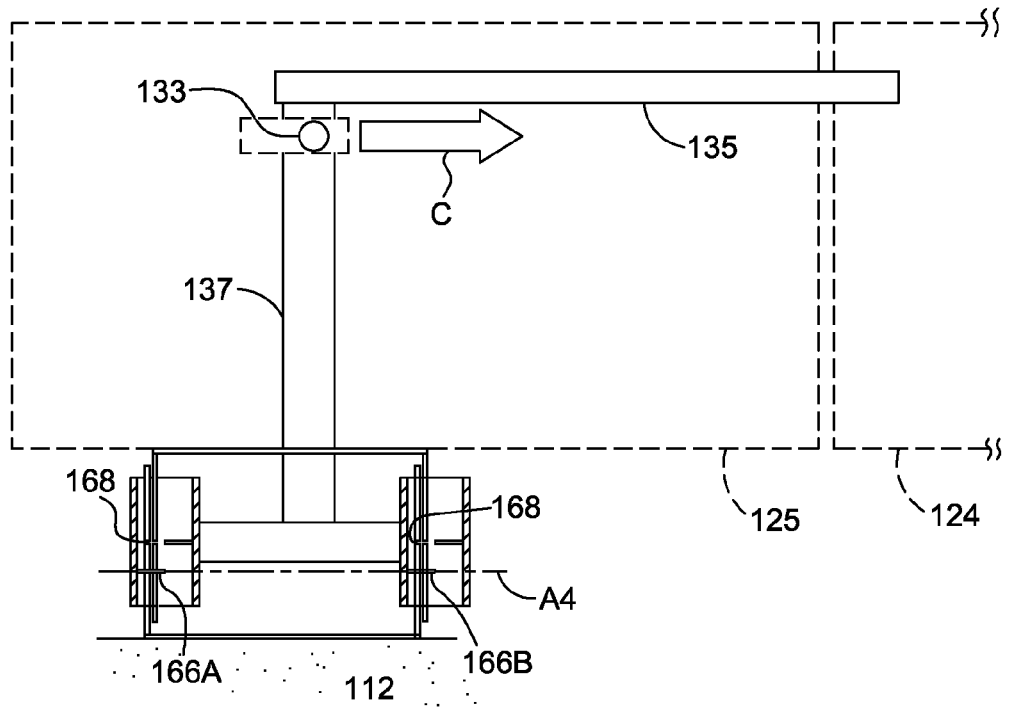
FIG. 6B is a schematic illustration in front view of the midgate latching mechanism and the hinge of the first closure panel of FIG. 3A-3F with the hinge shown in partial cross-sectional view, the closure panels shown in phantom and the midgate latching mechanism unlatched.

When the lever 133 is moved in the direction of arrow C to the far right position of FIG. 6B, the arm 135 latches the closure panels 125 and 124 together, and the second set of pins 166A, 166B slide into apertures 170, establishing a pivot axis A4 for the hinge 129 and for both closure panels 124, 125, as the pivot axis of hinge 126 is aligned with the set of pins 166A, 166B to share pivot axis A4, as indicated in FIG. 3A. When the hinges 129 and 126 are on different pivot axes A3, A4, respectively, the closure panels 124, 125 pivot open and closed along different swing arcs, protecting the two seal portions 144, 146 (shown in FIG. 4B) from contact with one another during pivoting.

Figure 3B:
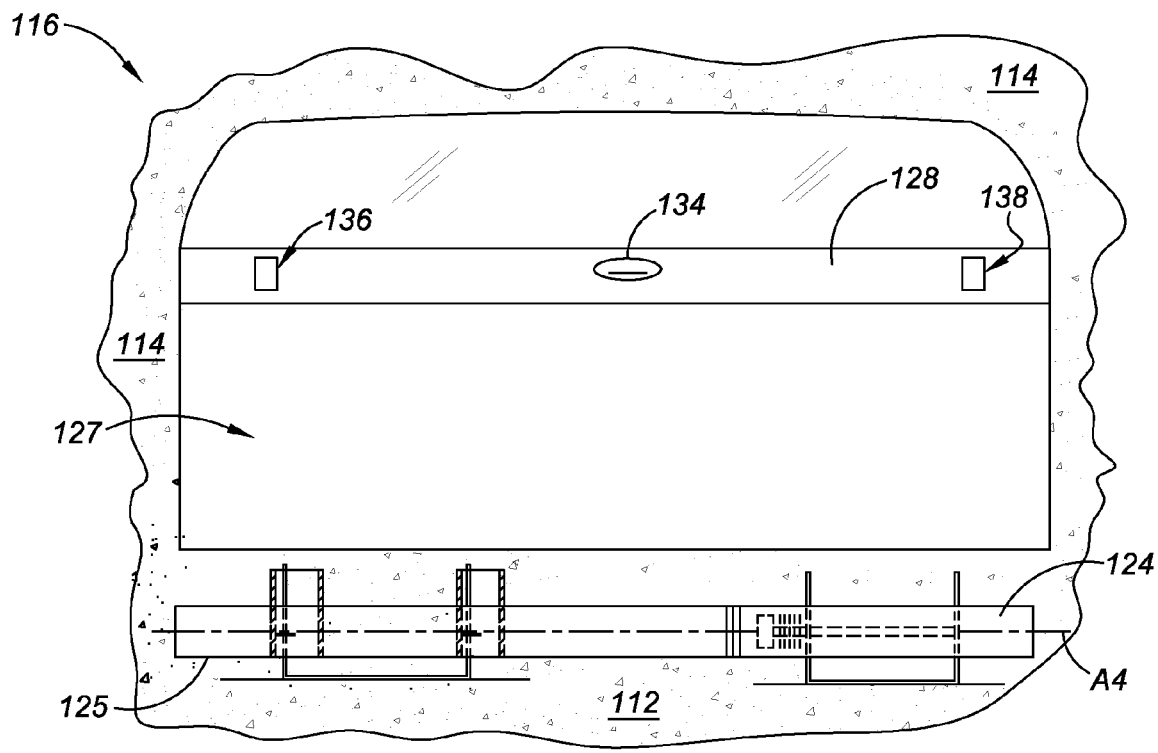
FIG. 3B is a schematic illustration in front view of the vehicle closure assembly of FIG. 3A with first and second closure panels both in open positions, the midgate latching mechanism latched and the hinge in partial cross-sectional view.
Figure 4A:
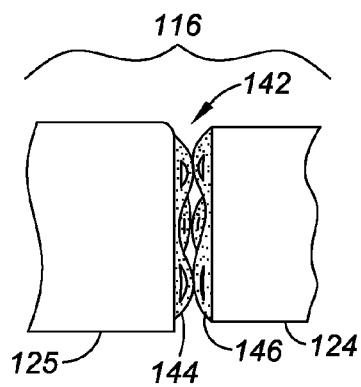
FIG. 4A is a schematic fragmentary illustration in bottom view of the seal assembly and closure panels of FIG. 3A.
Figure 4B:
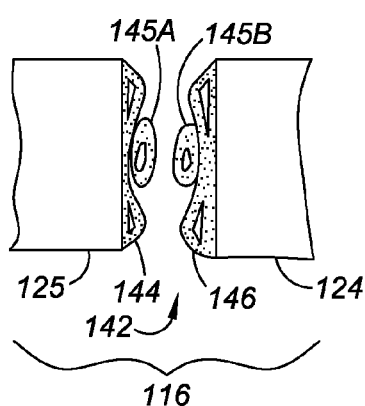
FIG. 4B is a schematic fragmentary illustration in bottom view of the seal assembly and closure panels of FIG. 3C.

Referring to FIG. 3B, with the crossbar latching assembly 134, 136, 138 unlatched, and the midgate latching assembly 132 latched as in FIG. 3A, the closure panels 124 and 125 are pivotable together about pivot axis A4 to the open positions shown in FIG. 3B to allow access to the interior compartment (forward of opening 127) form the cargo compartment (rearward of opening 127). Referring again to FIG. 3A, when the midgate latching assembly 132 is latched and the crossbar latching assembly 134, 136, 138 is latched, the closure assembly 116 seals the opening 127 of FIG. 3B with the seal assembly 142 tightly sealing the vertical split 140, as illustrated in FIG. 4A.

Figure 3C:
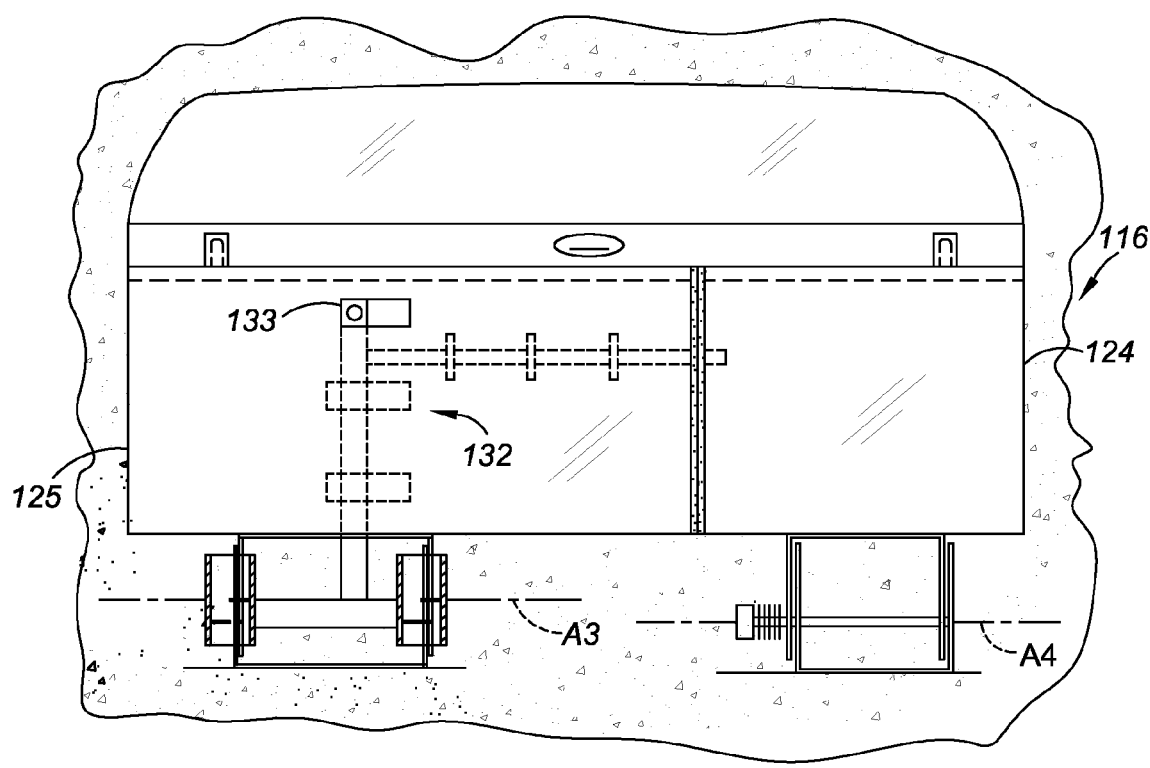
FIG. 3C is a schematic illustration in front view of the vehicle closure assembly of FIG. 3A with first and second closure panels both in closed positions, the midgate latching mechanism unlatched and the hinge in partial cross-sectional view.

Referring to FIG. 3C, to prepare to pivot one of the closure panels 124 or 125 independently to provide partial access through opening 127 of FIG. 3B, the lever 133 is moved to the unlatching position so that the midgate latching assembly 132 does not latch the closure panels 124, 125 to one another and pivot axis A3 is established for closure panel 125. Assuming crossbar latching assembly 134, 136, 138 is unlatched, the closure panels 124, 125 may be pivoted downward about their separate pivot axes A3, A4 to the open positions shown in FIG. 3D.

Figure 3D:
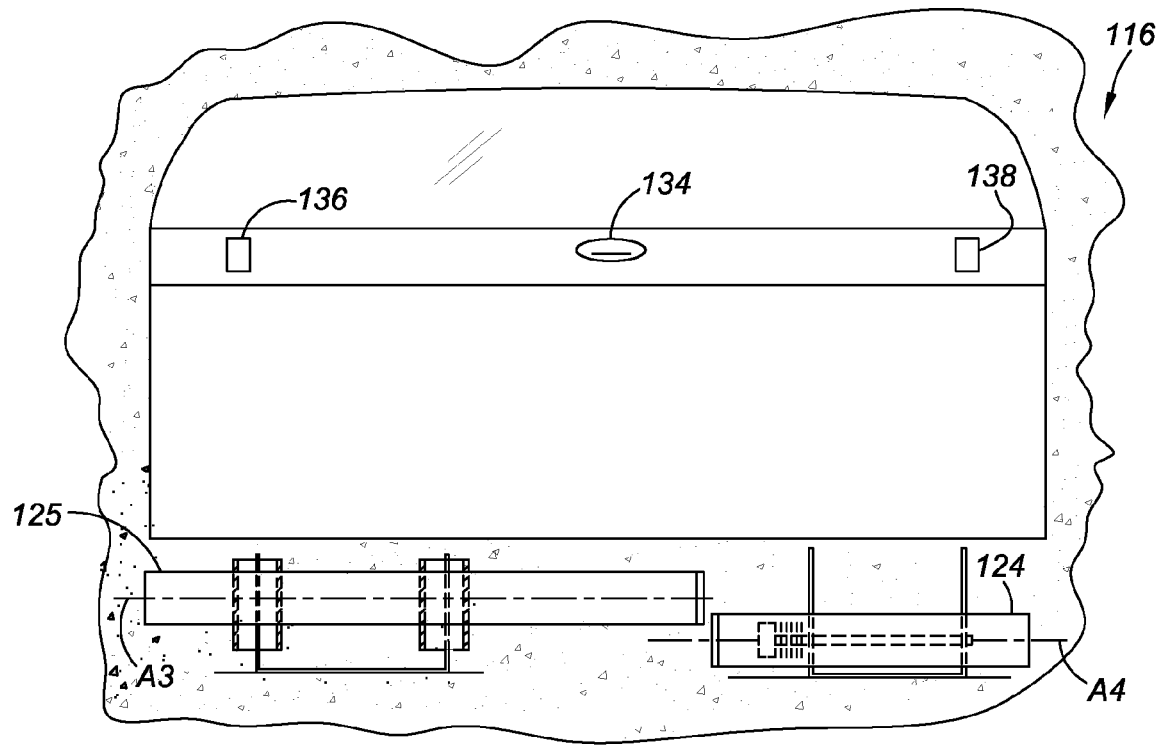
FIG. 3D is a schematic illustration in front view of the vehicle closure assembly of FIG. 3A with first and second closure panels both in open positions, the midgate latching mechanism unlatched and the hinge in partial cross-sectional view.
Figure 3E:
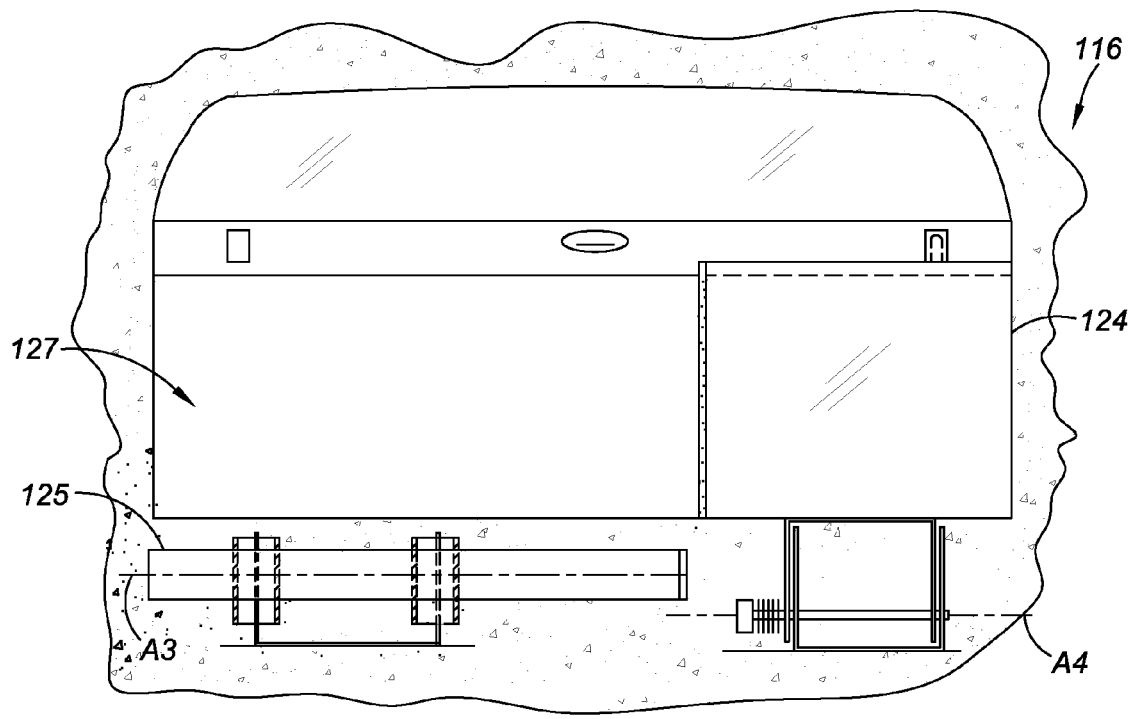
FIG. 3E is a schematic illustration in front view of the vehicle closure assembly of FIG. 3A with the first closure panel in an open position and the second closure panel in a closed position, the midgate latching mechanism unlatched and the hinge in partial cross-sectional view.
Figure 3F:
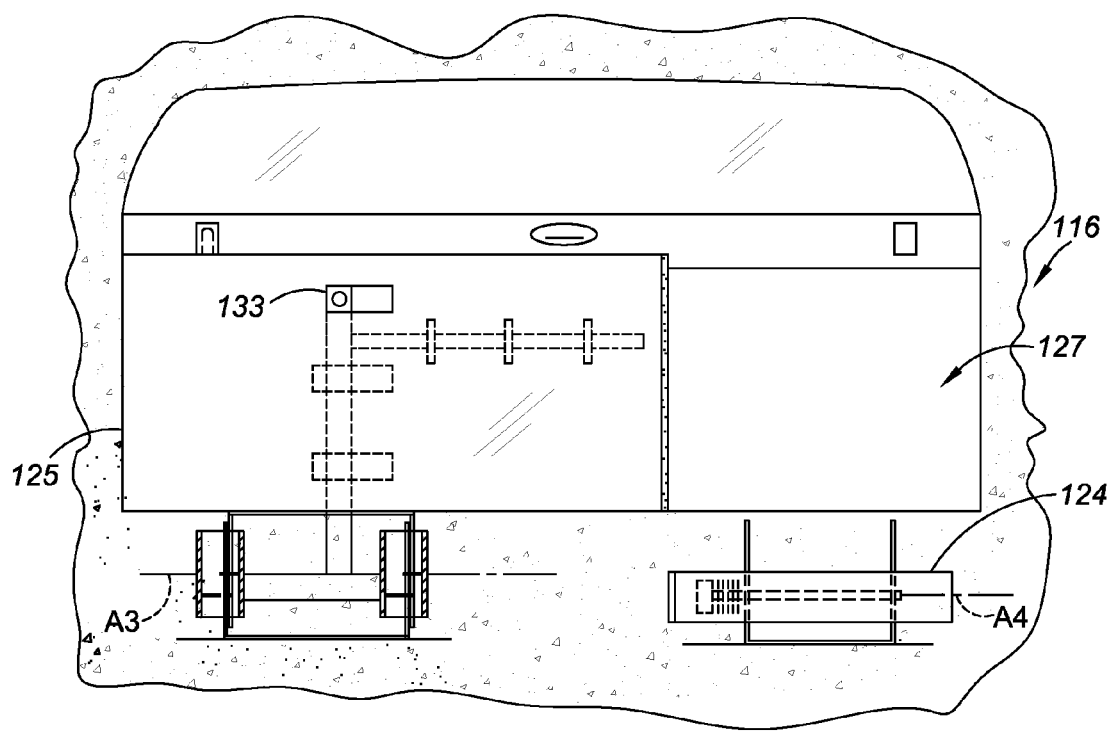
FIG. 3F is a schematic illustration in front view of the vehicle closure assembly of FIG. 3A with the first closure panel in a closed position and the second closure panel in an open position, the midgate latching mechanism unlatched and the hinge in partial cross-sectional view.

From the open positions of FIG. 3D or directly from the closed positions of FIG. 3C, in both of which the midgate latching assembly 132 and the crossbar latching assembly 134, 136, 138 are unlatched, the configuration of FIG. 3E may be established in which the closure panel 125 is in the open position and the closure panel 124 is in the closed position to allow access through the portion of opening 127 above closure panel 125. Alternatively, from the open positions of FIG. 3D or directly from the closed positions of FIG. 3C, the configuration of FIG. 3F may be established in which closure panel 124 is in the open position and closure panel 125 is in the closed position to allow access through the portion of opening 127 above closure panel 124.

Figure 7:
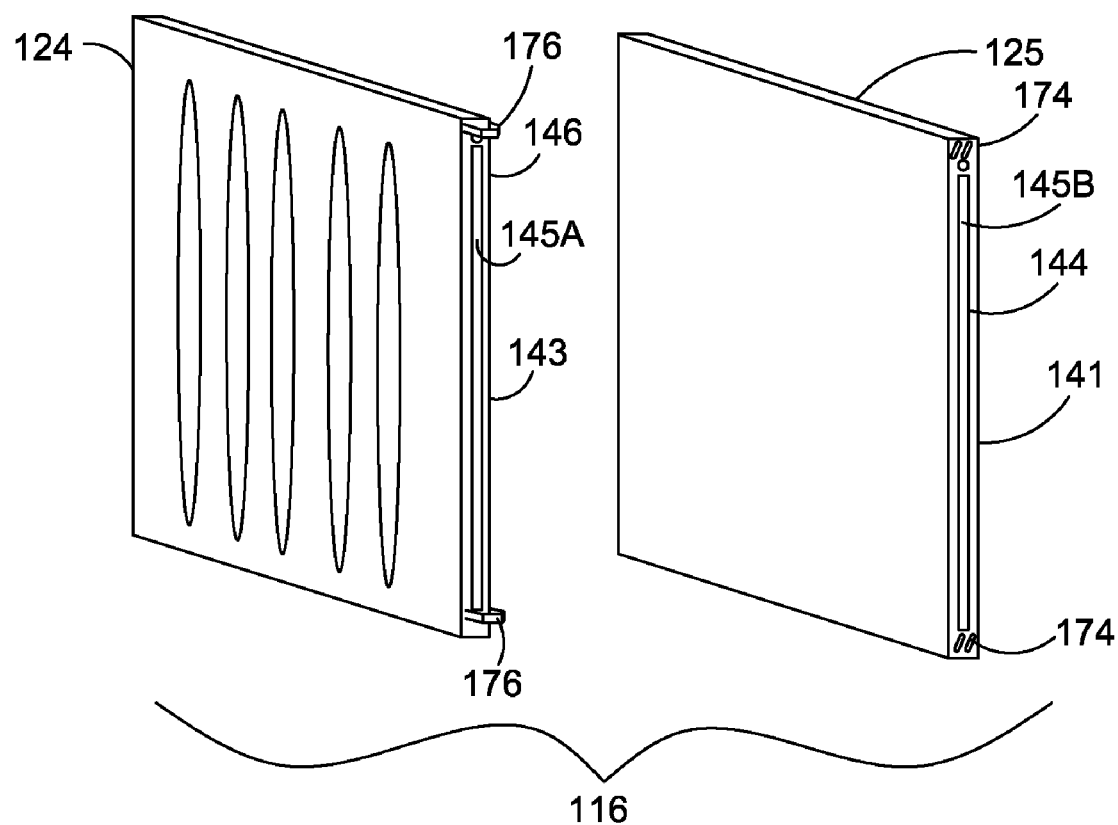
FIG. 7 is a schematic exploded view of the midgate vehicle closure assembly of FIGS. 3A-3F, with the closure panels rotated.

Referring to FIG. 7, the vehicle closure assembly 116 is illustrated with the closure panels 124 and 125 in exploded, rotated view disassembled from hinges 126 and 129 to show the seal portions 144 and 146 as well as seal members 145A and 145B. In this view, it is apparent that laterally-extending hooks 174 are secured near the top and bottom of the closure panel 125 on the side with the seal portion 144. Laterally extending retainers 176 extend from the closure panel 124 on the side with the second seal portion 146. When the closure panels are both in the closed position, as in FIGS. 3A and 3C, the hooks 174 engage with the retainers 176, to help retain closure panels 124, 125 in alignment as they pivot to the open positions of FIG. 3B. When the midgate latching assembly 132 is disengaged as in FIG. 3C to establish the different pivot axes A3 and A4 for the closure panels 125, 124, respectively, the different swing arcs of the closure panels 124, 125 will result in the hooks 174 being disengaged from the retainers 176 in the fully open positions of FIG. 3D. Preferably, similar hooks and retainers are employed on the vehicle closure assembly 16 of FIGS. 2A-2D. Such hooks will be engaged when both panels 24, 25 are in the closed position and will thus alleviate the need for manual force to hold the panels 24, 25 together when latching and unlatching the midgate latching assembly 32. The cam 52 will cause the hooks to separate from the retainers as the unlatched panels 24, 25 are lowered.

While the best modes for carrying out the invention have been described in detail, those familiar with the art to which this invention relates will recognize various alternative designs and embodiments for practicing the invention within the scope of the appended claims.

The invention claimed is:

1. A vehicle closure assembly for selectively closing an opening to a compartment in a vehicle body, comprising:
   first and second closure panels mounted side-by-side to the vehicle body; wherein the closure panels are independently selectively pivotable with respect to the vehicle body about at least one pivot axis between an open position in which the respective closure panel does not close a respective portion of the opening, and a closed position in which the respective pivoted panel closes the respective portion of the opening; wherein the closure panels define a split therebetween when both are in the closed position; wherein the split extends in a direction substantially perpendicular to the at least one pivot axis;
   a seal assembly connected to the closure panels along the split to seal the split when the opening is closed by the closures panels, the seal assembly and closed closure panels thereby sealing the opening;
   a hinge operatively connected to one of the closures panels to permit pivoting of said one of the closure panels with respect to the vehicle body; and wherein the hinge is configured to cause said one of said closure panels to move laterally to allow sufficient separation of the closure panels at the seal assembly to thereby permit said independent pivoting of the closure panels without interference from the seal assembly.

2. The vehicle closure assembly of claim 1, further comprising:
   a first latching mechanism operable to selectively secure the closure panels in the closed position and to selectively release the closure panels to permit the closure panels to be pivoted to the open position.

3. The vehicle closure of claim 2, further comprising:
   a crossbar spanning the vehicle body laterally above the closure panels; and wherein the first latching mechanism selectively secures the closure panels to and releases the closure panels from the crossbar.

4. The vehicle closure assembly of claim 1, further comprising:
   a second latching mechanism operable to selectively secure the first closure panel to the second closure panel and to selectively release the closure panels from one another.

5. The vehicle closure assembly of claim 4, wherein said hinge is a first hinge; and further comprising:
a second hinge operatively connected to the other of the closure panels; wherein the second latching mechanism is operatively connected with the first hinge; wherein the second latching mechanism is selectively movable laterally to thereby move the first hinge from a first lateral position to a second lateral position when the second latching mechanism is moved laterally;
wherein the first and second hinges are aligned to establish a first of said at least one pivot axis when the first hinge is in the first lateral position to permit both of the closure panels to pivot in unison about the first pivot axis when latched to one another by the second latching mechanism; and
wherein the first hinge establishes a second of said at least one pivot axis for said one of said closures panels when in the second lateral position to permit pivoting of the closure panels about said respective first and second separate pivot axes to thereby cause said separation of the closure panels at the seal assembly.

6. The vehicle closure of claim 5, wherein the first hinge includes a fixed portion secured to the vehicle body and a movable portion connected for lateral movement with the second latching mechanism; and
wherein the movable portion includes first and second offset pins selectively alternately engagable with the fixed portion as the first hinge moves from the first lateral position to the second lateral position to establish the first and second pivot axes.

7. The vehicle closure assembly of claim 4, wherein the hinge includes a cam configured to cause said one of said closure panels to move laterally as said one of said closure panels is pivoted when the closure panels are released from one another by the second latching mechanism.

8. The vehicle closure of claim 4, further comprising:
a laterally extending hook connected to one of the closure panels and a laterally-extending retainer connected to the other of the closure panels; and wherein the hook engages the retainer when the closure panels are both in the closed position and is disengaged from the retainer when the closure panels are both in the open position and the second latching mechanism is unlatched.

9. The vehicle closure of claim 1, wherein the seal assembly includes a first seal portion secured to one of the closure panels and a second seal portion secured to the other of the closure panels; and wherein said first seal portion is configured to nest within the second seal portion when the closure panels are both in the closed position to enhance sealing.

10. The vehicle closure of claim 1, wherein the compartment is an interior passenger compartment; and wherein the closure panels form a vehicle midgate between the compartment and a vehicle bed.

11. A vehicle closure assembly for selectively closing an opening in a vehicle body, comprising:
first and second closure panels mounted side-by-side to the vehicle body; wherein the closure panels are pivotable with respect to the vehicle body between an open position in which the opening is not closed by the closures, and a closed position in which the respective pivoted panel closes a respective portion of the opening; wherein the closure panels define a split therebetween when in the closed position;
a seal assembly connected to the closure panels along the split to seal the split when the opening is closed by the closures panels, the seal assembly and closed closure panels thereby sealing the opening;
a latching mechanism operable to selectively secure the first closure panel to the second closure panel and to selectively release the closure panels from one another;
a hinge operatively connected to one of the closure panels to permit pivoting of said one of the closure panels with respect to the vehicle body; wherein said hinge includes a cam configured to cause said one of said closure panels to move laterally with respect to the other closure panel as the said one of said closure panels is pivoted when said closure panels are released from one another by said second latching mechanism; and
wherein said seal assembly includes a first seal portion secured to one of the closure panels and a second seal portion secured to the other of the closure panels; and wherein said first portion nests within said second portion when the closure panels are both in the closed position to enhance sealing.

* * * * *